United States Patent
Nangare et al.

(10) Patent No.: US 8,300,339 B1
(45) Date of Patent: Oct. 30, 2012

(54) METHOD AND SYSTEM FOR COMPENSATING FOR ADJACENT TRACKS DURING READING OF DATA

(75) Inventors: Nitin Nangare, Santa Clara, CA (US); Gregory Burd, San Jose, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/882,802

(22) Filed: Sep. 15, 2010

Related U.S. Application Data (60) Provisional application No. 61/247,924, filed on Oct. 1, 2009, provisional application No. 61/294,424, filed on Jan. 12, 2010, provisional application No. 61/298,119, filed on Jan. 25, 2010.

(51) Int. Cl.
*G11B 5/09* (2006.01)
*G11B 5/035* (2006.01)

(52) U.S. Cl. .................. 360/39; 360/46; 360/65
(58) Field of Classification Search .................. None
See application file for complete search history.

(56) References Cited

U.S. PATENT DOCUMENTS

| 6,724,702 | B2 * | 4/2004 | Taguchi et al. | 369/47.17 |
|---|---|---|---|---|
| 6,963,528 | B2 * | 11/2005 | Ogura | 369/59.22 |
| 7,126,890 | B2 * | 10/2006 | Learned et al. | 369/44.32 |
| 7,218,665 | B2 * | 5/2007 | McElwain | 375/143 |
| 2003/0218955 | A1 * | 11/2003 | Isshiki et al. | 369/59.21 |
| 2007/0177292 | A1 * | 8/2007 | Bui et al. | 360/46 |

* cited by examiner

*Primary Examiner* — Regina N Holder (57) ABSTRACT

A storage controller includes a device controller and a read data channel. The read data channel includes a decoder for decoding output of a detector, where the detector is for reading data requested from a storage medium by the device controller, and the storage medium has a plurality of tracks of data thereon. When the device controller requests data from a current track of data on the storage device, the detector reads an adjacent track of data, the decoder decodes data from the adjacent track of data, the detector reads data from the current track, and the decoder decodes the data read from the current track, based on the decoded and stored data from the adjacent track of data. A storage system includes a storage medium having a plurality of tracks of data thereon and a storage controller as described above.

15 Claims, 7 Drawing Sheets

METHOD AND SYSTEM FOR COMPENSATING FOR ADJACENT TRACKS DURING READING OF DATA

CROSS REFERENCE TO RELATED APPLICATIONS

This claims the benefit of commonly-assigned U.S. Provisional Patent Application No. 61/247,924, filed Oct. 1, 2009, of commonly-assigned U.S. Provisional Patent Application No. 61/294,424, filed Jan. 12, 2010, and of commonly-assigned U.S. Provisional Patent Application No. 61/298,119, filed Jan. 25, 2010, each of which is hereby incorporated by reference herein in its respective entirety.

FIELD OF INVENTION

This invention relates to a method and system for reading data that has been recorded in tracks on a storage medium and is read by a read head that moves relative to the surface of the storage medium. More particularly, this invention relates to compensating, during a read operation, for contributions to the read signal from an adjacent track or tracks.

BACKGROUND

In magnetic recording, as one example of a type of recording in which reading and writing are performed by a head that moves relative to the surface of the storage medium, data may be written in circular tracks on a magnetic disk. To read data on a given track, the read head may be centered on that particular track. However, sometimes the read head may deviate from its ideal path and stray "off-track," with part of the head over the "main track" (i.e., the track to be read) and part of the head over an adjacent track. In such a case, the read-back signal produced at the read head is a superposition of a signal from the main track and a signal from the adjacent track.

In addition, in order to increase recording density, it has become common to write tracks very close to each other. There is even a technique known as "shingled recording" in which adjacent tracks overlap one another. In such cases, the width of the read head may be greater than the track pitch (i.e., the distance between adjacent tracks) which results in a contribution from one or more adjacent tracks in the read-back signal for the main track of interest.

The contribution from an adjacent track presents similar challenges whether it results from small track pitch, in which case it may be referred to as "inter-track interference" (ITI), or from an off-track condition in which case it may be referred to as "off-track interference" (OTI).

SUMMARY

An embodiment of a method for reading a current track of data from a storage device includes reading an adjacent track of data, decoding data from the adjacent track of data, reading data from the current track, and decoding the data read from the current track, including taking account of based on the decoded data from the adjacent track of data.

An embodiment of a storage controller includes a device controller and a read data channel. The read data channel includes a decoder for decoding output of a detector, where the detector is for reading data requested from a storage medium by the device controller, and the storage medium has a plurality of tracks of data thereon. When the device controller requests data from a current track of data on the storage device, the detector reads an adjacent track of data, the decoder decodes data from the adjacent track of data, the detector reads data from the current track, and the decoder decodes the data read from the current track, based on the decoded data from the adjacent track of data.

An embodiment of a storage system includes a storage medium having a plurality of tracks of data thereon; and a storage controller as described above.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

This invention relates to a method and system for factoring out adjacent-track signals from a data storage read-back signal. The goal is to recover a clear main-track data signal, whether the adjacent track signals result from ITI in a case of shingled recording or other small-track-pitch recording techniques, or from OTI in a case where the read head has gone off-track.

Figure 1:
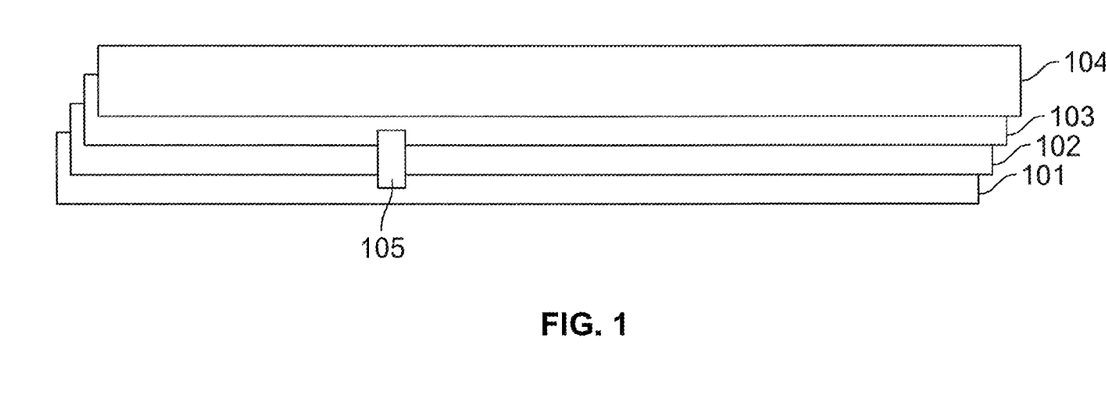
FIG. 1 is a simplified schematic view of four shingled data tracks with a read head.
Figure 2:
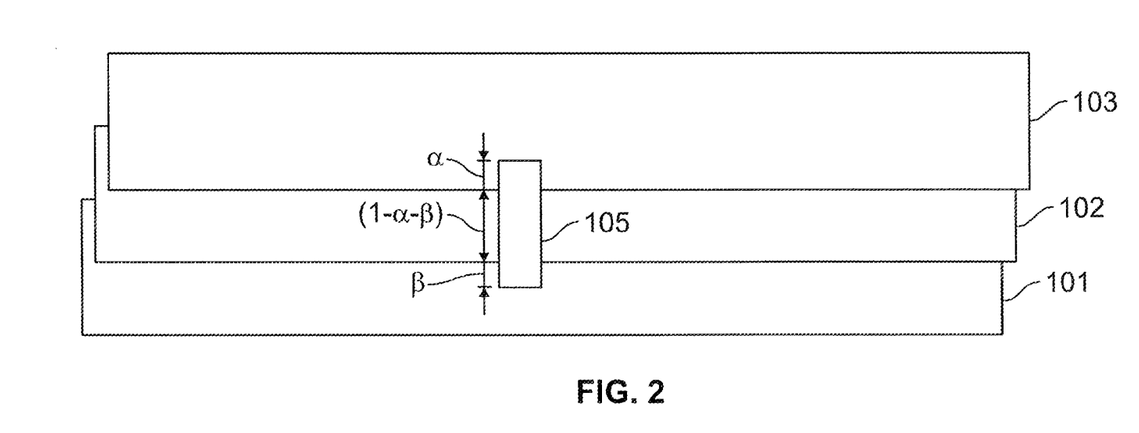
FIG. 2 is a close-up view of three of the tracks of FIG. 1 with a read head.

FIG. 1 shows a simplified schematic view of four shingled data tracks 101, 102, 103, 104, with a read-head 105 wider than the track pitch. FIG. 2 shows a close-up view of read head 105 and three of the tracks 101, 102, 103, showing the contributions from each track to the read-back signal.

Specifically, if $\bar{y}_2, \bar{y}_1, \bar{y}_0$ are the respective noiseless channel read-back signals corresponding to three tracks 101, 102, 103 in the absence of ITI, then the component y of the total read-back signal (including ITI from tracks 101 and 103) that is contributed by main track 102 may be written as $y=(1-\alpha-\beta)\bar{y}_1+\alpha\bar{y}_0+\beta\bar{y}_2$, where $\alpha$ and $\beta$ are the respective amplitude contributions from tracks 103 and 101.

If $\bar{y}_0$ and $\bar{y}_2$, or estimates of $\bar{y}_0$ and $\bar{y}_2$, were known, then $\bar{y}_1$ could be determined by subtracting $\alpha\bar{y}_0+\beta\bar{y}_2$ from y, and then dividing by $(1-\alpha-\beta)$:

$$\bar{y}_1=(y-\alpha\bar{y}_0-\beta\bar{y}_2)/(1-\alpha-\beta)$$

Figure 3:
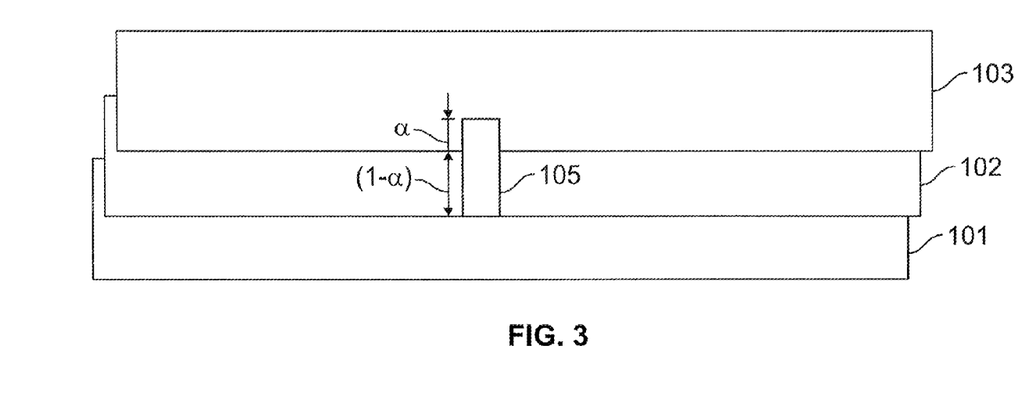
FIG. 3 shows how a read head may be positioned to pick up signals from only one adjacent track.

This can be simplified if, as shown in FIG. 3, the read head can be positioned so that substantially all of the ITI contribution is derived from only one of the adjacent tracks 103, so that:

$$\bar{y}_1=(y-\alpha\bar{y}_0)/(1-\alpha)$$

Figure 4:
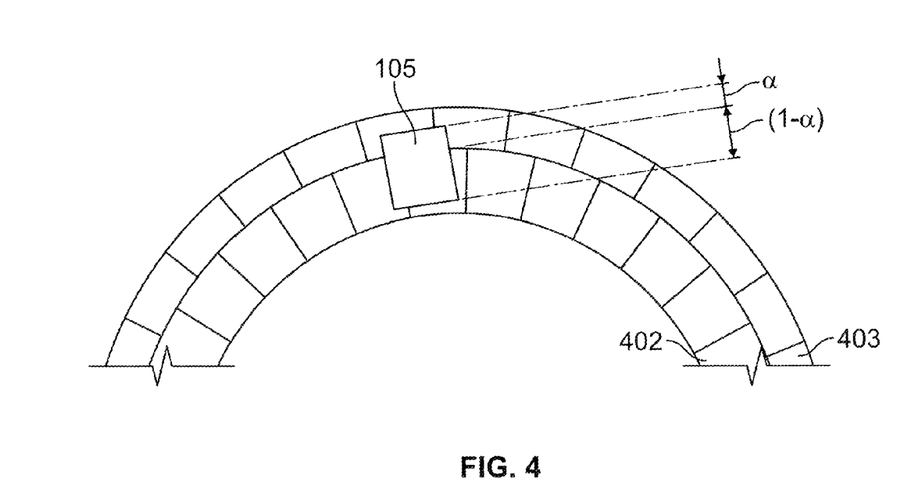
FIG. 4 shows a read head in an off-track position.

A similar result is obtained in the off-track case, as shown in FIG. 4, where the main track is track 402 and the adjacent track which is erroneously partially read is track 403. Again, if $\bar{y}_1$, $\bar{y}_0$ are the respective noiseless channel read-back signals corresponding to the two tracks 402, 403 in the absence of OTI, then:

$$\bar{y}_1 = (y - \alpha \bar{y}_0)/(1-\alpha).$$

Therefore, if the signal quality degrades, it does not matter whether the degradation results from ITI or OTI. The techniques described herein can be applied to factor out the interference in either case.

Returning to the view of FIG. 3, there will be some track 103 at the edge of the storage medium (e.g., disk drive platter) for which there is no adjacent track to cause ITI and that track can be read to obtain $\bar{y}_0$. Each subsequent track 102, 101, etc., could then be read, subtracting out the contribution from adjacent track 103, 102, etc. and thereby also providing a respective value of "$\bar{y}_0$" for compensating for ITI on each further subsequent track. As a practical matter, if a storage device has a large number of tracks, and the target track is not near the edge of the device, one would not necessarily be able to read all of the tracks from the edge to the track of interest. However, if the track adjacent to the track of interest has not previously been read, it should be possible to read that adjacent track and thereby form at least an estimate for $\bar{y}_0$ for that adjacent track, even though that estimate may include ITI from a further track.

This can be generalized as follows:

If $h_k$ represents the channel target, $a_1(t)$ and $a_2(t)$ represent the main-track bits and adjacent-track bits, respectively, $n_1(t)$ and $n_2(t)$ represent the main-track jitter noise and adjacent-track jitter noise, respectively, $\alpha$ represents the adjacent-track amplitude factor, $\tau$ represents the adjacent-track phase factor, and $n_{awgn}$ represents AWGN read-back noise, then:

$$\text{ideal main\_track signal } \hat{y}_1(t) = \sum_k h_k \cdot a_1(t-k) \text{ and}$$

$$\text{ideal adjacent\_track signal } \hat{y}_2(t) = \sum_k h_k \cdot a_2(t-k)$$

From this we can derive that the total read-back signal from the main track and the adjacent track is $$y(t) = (1-\alpha) \cdot y_1(t) + \alpha \cdot y_2(t-\tau) + n_{awgn}(t) = (1-\alpha) \cdot [\hat{y}_1(t) + n_1(t)] + \alpha \cdot [\hat{y}_2(t-\tau) + n_2(t-\tau)] + n_{awgn}(t)$$

If one multiplies both sides by $\hat{y}_2(t)$, and then takes the expectation on both sides, the result will be:

$$E[y(t) \cdot \hat{y}_2(t)] = (1-\alpha) \cdot E[\hat{y}_1(t) \cdot \hat{y}_2(t)] + (1-\alpha) \cdot E[n_1(t) \cdot \hat{y}_2(t)] + \alpha \cdot E[\hat{y}_2(t-\tau) \cdot \hat{y}_2(t)] + \alpha \cdot E[n_2(t-\tau) \cdot \hat{y}_2(t)] + E[n_{awgn}(t) \cdot \hat{y}_2(t)]$$

The following terms are uncorrelated and hence are zero:

$$E[\hat{y}_1(t) \cdot \hat{y}_2(t)] = 0$$

$$E[n_1(t) \cdot \hat{y}_2(t)] = 0$$

$$E[n_{awgn}(t) \cdot \hat{y}_2(t)] = 0$$

The following term is very small and can be considered to be zero:

$$E[n_2(t-\tau) \cdot \hat{y}_2(t)] \approx 0$$

This leaves:

$$E[y(t) \cdot \hat{y}_2(t)] = \alpha \cdot E[\hat{y}_2(t-\tau) \cdot \hat{y}_2(t)]$$

For a band-limited signal $\hat{y}_2(t)$, sampled at greater than or equal to the Nyquist rate, we can write the term $\hat{y}_2(t-\tau)$ as:

$$\hat{y}_2(t-\tau) = \sum_{i=-\infty}^{i=+\infty} a_i \cdot \hat{y}_2(t-i)$$

where $a_i \in \text{sinc}(i-\tau)$

This can be approximated as a finite $(2n+1)$-tap interpolation filter:

$$\hat{y}_2(t-\tau) \approx \sum_{i=-n}^{i=+n} a_i \cdot \hat{y}_2(t-i)$$

Substituting, one gets:

$$E[y(t) \cdot \hat{y}_2(t)] = \alpha \cdot E \sum_{i=-n}^{i=+n} a_i \cdot \hat{y}_2(t-i) \cdot \hat{y}_2(t)$$

or:

$$E\left[\hat{y}_2(t) \cdot \begin{bmatrix} \hat{y}_2(t-n) \\ \hat{y}_2(t-n+1) \\ \vdots \\ \hat{y}_2(t) \\ \vdots \\ \hat{y}_2(t+n-1) \\ \hat{y}_2(t+n) \end{bmatrix}^T \right] \cdot \begin{bmatrix} A_{-n} \\ A_{-n+1} \\ \vdots \\ A_0 \\ \vdots \\ A_{n-1} \\ A_n \end{bmatrix} = E[y(t) \cdot \hat{y}_2(t)]$$

where $A_i = \alpha a_i$.

Instead of multiplying both sides of the expression for $y(t)$ by $\hat{y}_2(t)$, one can multiply both sides by $\hat{y}_2(t-i)$, $\forall i : n \leq i \leq +n$, which would yield $2n+1$ equations, and which, after then taking the expectation, can be written in matrix form as follows:

$$E\left[ \begin{bmatrix} \hat{y}_2(t-n) \\ \hat{y}_2(t-n+1) \\ \vdots \\ \hat{y}_2(t) \\ \vdots \\ \hat{y}_2(t+n-1) \\ \hat{y}_2(t+n) \end{bmatrix} \cdot \begin{bmatrix} \hat{y}_2(t-n) \\ \hat{y}_2(t-n+1) \\ \vdots \\ \hat{y}_2(t) \\ \vdots \\ \hat{y}_2(t+n-1) \\ \hat{y}_2(t+n) \end{bmatrix}^T \right] \cdot \begin{bmatrix} A_{-n} \\ A_{-n+1} \\ \vdots \\ A_0 \\ \vdots \\ A_{n-1} \\ A_n \end{bmatrix} = E\begin{bmatrix} y(t) \cdot \hat{y}_2(t-n) \\ y(t) \cdot \hat{y}_2(t-n+1) \\ \vdots \\ y(t) \cdot \hat{y}_2(t) \\ \vdots \\ y(t) \cdot \hat{y}_2(t+n-1) \\ y(t) \cdot \hat{y}_2(t+n) \end{bmatrix}$$

Or alternatively:

$$\underbrace{\begin{bmatrix} R(0) & R(1) & \ldots & R(n) & \ldots & R(2n-1) & R(2n) \\ R(-1) & R(0) & & & & & R(2n-1) \\ \vdots & \vdots & \ddots & & & \ddots & \vdots \\ R(-n) & \vdots & & R(0) & & & \vdots \\ \vdots & \vdots & \ddots & & \ddots & & \vdots \\ R(-2n+1) & R(-2n+2) & & \ddots & & R(0) & R(1) \\ R(-2n) & R(-2n+1) & & & & R(-1) & R(0) \end{bmatrix}}_{\mathcal{R}}.$$

-continued $$\begin{bmatrix} A_{-n} \\ A_{-n+1} \\ \vdots \\ A_0 \\ \vdots \\ A_{n-1} \\ A_n \end{bmatrix}_A = E \begin{bmatrix} y(t) \cdot \hat{y}_2(t-n) \\ y(t) \cdot \hat{y}_2(t-n+1) \\ \vdots \\ y(t) \cdot \hat{y}_2(t) \\ \vdots \\ y(t) \cdot \hat{y}_2(t+n-1) \\ y(t) \cdot \hat{y}_2(t+n) \end{bmatrix}_P$$

where $\mathfrak{R}$ is the correlation matrix of the ideal adjacent-track signal, A is the interpolation filter, and P is the cross-correlation of the received signal and the ideal adjacent-track signal.

The interpolation filter taps can therefore be obtained by solving the following equation:

$$A = \mathfrak{R}^{-1} \cdot P$$

Correlation matrix terms depend only on the target taps and therefore can be pre-computed once the target is fixed:

$$C_i = \text{Auto-Correlation}([h_0 \ldots h_k])$$

$(i,j)^{th}$ entry of matrix $\mathfrak{R}$ is $\mathfrak{R}(i,j) = C(|i-j|)$

Accordingly, the target signal y'(t) can be obtained by removing the interfering adjacent-track signal as follows:

$$y'(t) = y(t) - \begin{bmatrix} A_{-n} \\ A_{-n+1} \\ \vdots \\ A_0 \\ \vdots \\ A_{n-1} \\ A_n \end{bmatrix}^T \cdot \begin{bmatrix} \hat{y}_2(t-n) \\ \hat{y}_2(t-n+1) \\ \vdots \\ \hat{y}_2(t) \\ \vdots \\ \hat{y}_2(t+n-1) \\ \hat{y}_2(t+n) \end{bmatrix}$$

Thus, if a sector-read operation fails because of OTI or ITI, the sector can be recovered by carrying out the following method:

First, the adjacent-track is read and the decoded adjacent-track bits are stored. If the adjacent track itself is subject to ITI (because a small-track-pitch recording technique such as shingled recording was used), this process may have to iterated until the edge of the medium, or at least a known track, is reached, or an estimate of the adjacent track may have to be used.

Next, the failed sector is re-read and the vector P is computed from the readings. The interpolation filter A is then computed from the matrix $\mathfrak{R}^{-1}$, which will have been previously pre-computed and stored. The filter A can be used to remove the interfering adjacent-track signal and obtain a corrected signal, and the corrected signal can be decoded to obtain the corrected data from the target track.

As discussed above, in a small-track-pitch situation, ITI contributions might be received from more than one adjacent track. The foregoing discussion has assumed that the read head could be placed in such a position that it would receive ITI contributions from only one adjacent track. However, if the track pitch is very small, it may not be possible to limit the ITI contributions to those from one adjacent track. For such a system, to read a current-track k, in general tracks k−n, k−n+1 ..., k, ..., k+n−1, k+n would be processed to remove ITI contributions from tracks k−n, ..., k−1 and k+1, ..., k+n.

Figure 5:
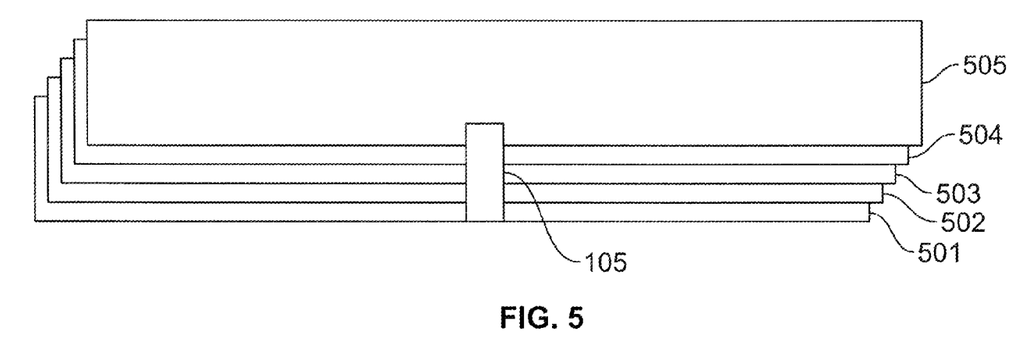
FIG. 5 is a view, similar to FIG. 1, showing a multiple-track embodiment.
Figure 6:
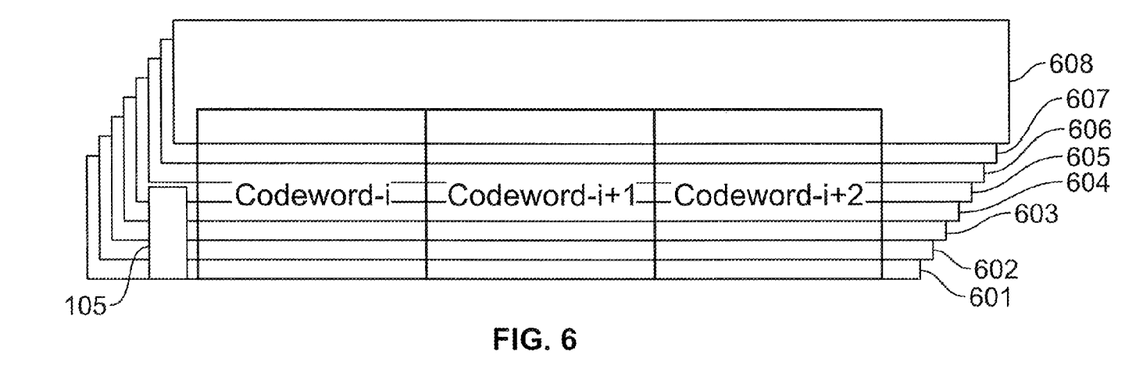
FIG. 6 is a representation of two-dimensional codewords in an embodiment like that of FIG. 5.

Indeed, in the embodiment shown in FIG. 5, the track pitch is so small relative to the width of the read head that the read head 105 overlaps five tracks 501-505 (n=2), so to read track 103, one must remove contributions from tracks 101, 102, 104 and 105. Alternatively, such an embodiment may be one that employs two-dimensional coding, where the channel coding runs across tracks as well as along each track, to read more than one track at a time. FIG. 6 shows how the codewords i, i+1, i+2 . . . span multiple tracks 601-608. In such an embodiment, rather than decoding each track after the ITI contribution of its adjacent track or tracks have been removed, all of the tracks spanned by a codeword are processed sequentially, as described above, to remove ITI contributions without decoding any individual track, and then the codeword(s) can be decoded.

It will be appreciated from the methods described above that data from one or more tracks that have been read previously will be used in the process of decoding one or more current tracks. It will further be appreciated that while the discussion above describes reading of the adjacent track before the current track, it is possible to read and store the current track data first, and then to read the adjacent track to determine its ITI contribution. In such a case, unless the adjacent track had been processed previously, an estimate of its ITI contribution may have to be used.

Figure 7:
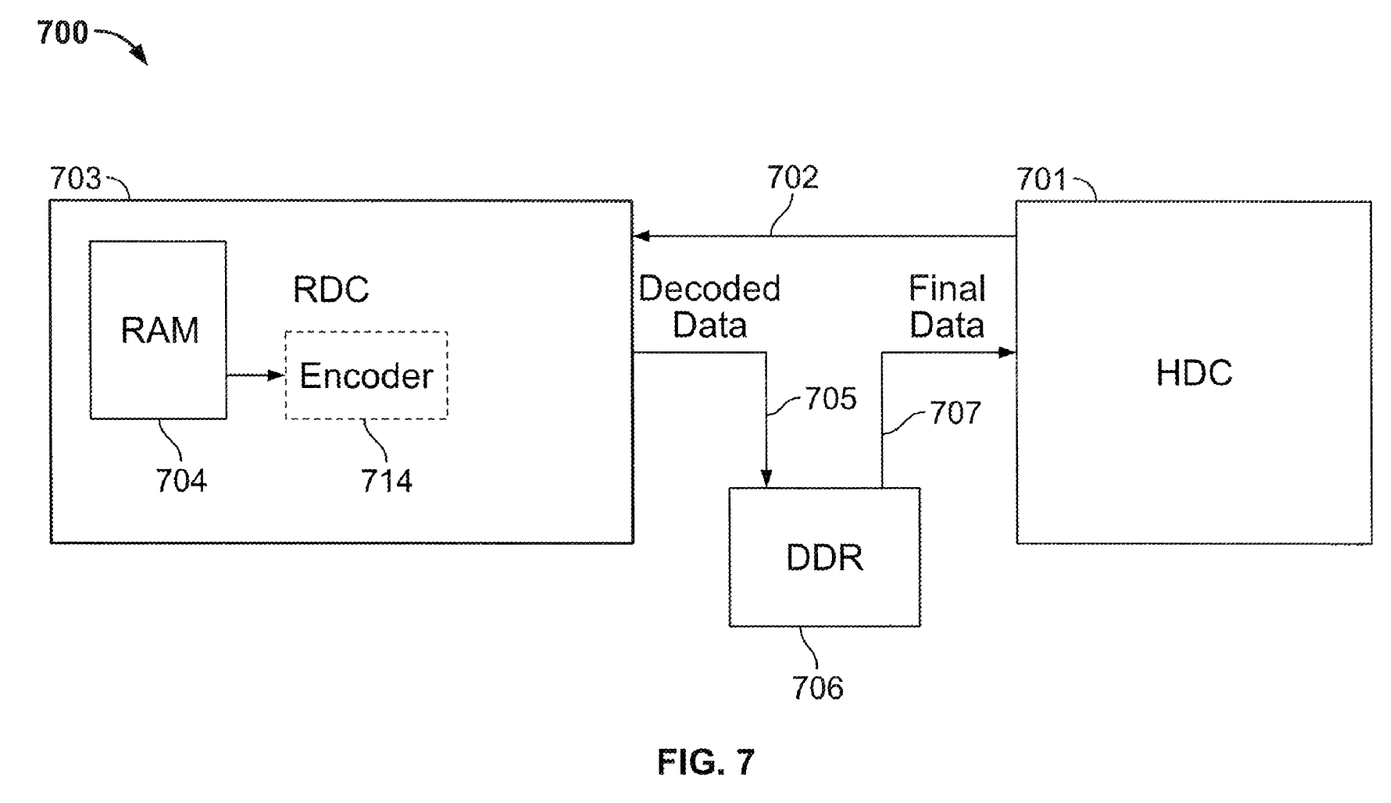
FIG. 7 is a schematic representation of apparatus according to a first embodiment of the invention.

FIG. 7 shows a schematic representation of apparatus 700 for carrying out such methods, which may be used in a storage device such as, e.g., a disk drive. The storage device may have a controller 701 (e.g., a hard disk controller, or HDC, where the device is a hard disk drive) which controls various functions and components of the device (not all of which are shown in FIG. 7). Controller 701 may send read commands 702 to read-data channel 703, which may include at least one detector—e.g., a SOVA detector (not shown)—and at least one decoder—e.g., a Viterbi decoder (not shown).

In accordance with embodiments of the present invention, read-data channel 703 also may include memory, such as RAM 704, for storing decoded data (e.g., NRZ data) from one or more previously-read tracks. As each track is decoded within read-data channel 703, the decoder can reference the data stored in RAM 704 for an adjacent track or tracks, in order to decode the current track or tracks, using the methods described above. The decoded channel data 705 is at least temporarily stored in double-data-rate SDRAM 706 from which it is read at 707 by device controller 701.

Instead of storing the NRZ data from the previously-read track or tracks in RAM 704, if the previous track or tracks were successfully decoded, the actual decoded user bits may be stored in RAM 704, which would consume less space in RAM 704. In such an embodiment, optional encoder 714 would be provided to re-encode the user bits for use in removing ITI from the current track.

Figure 8:
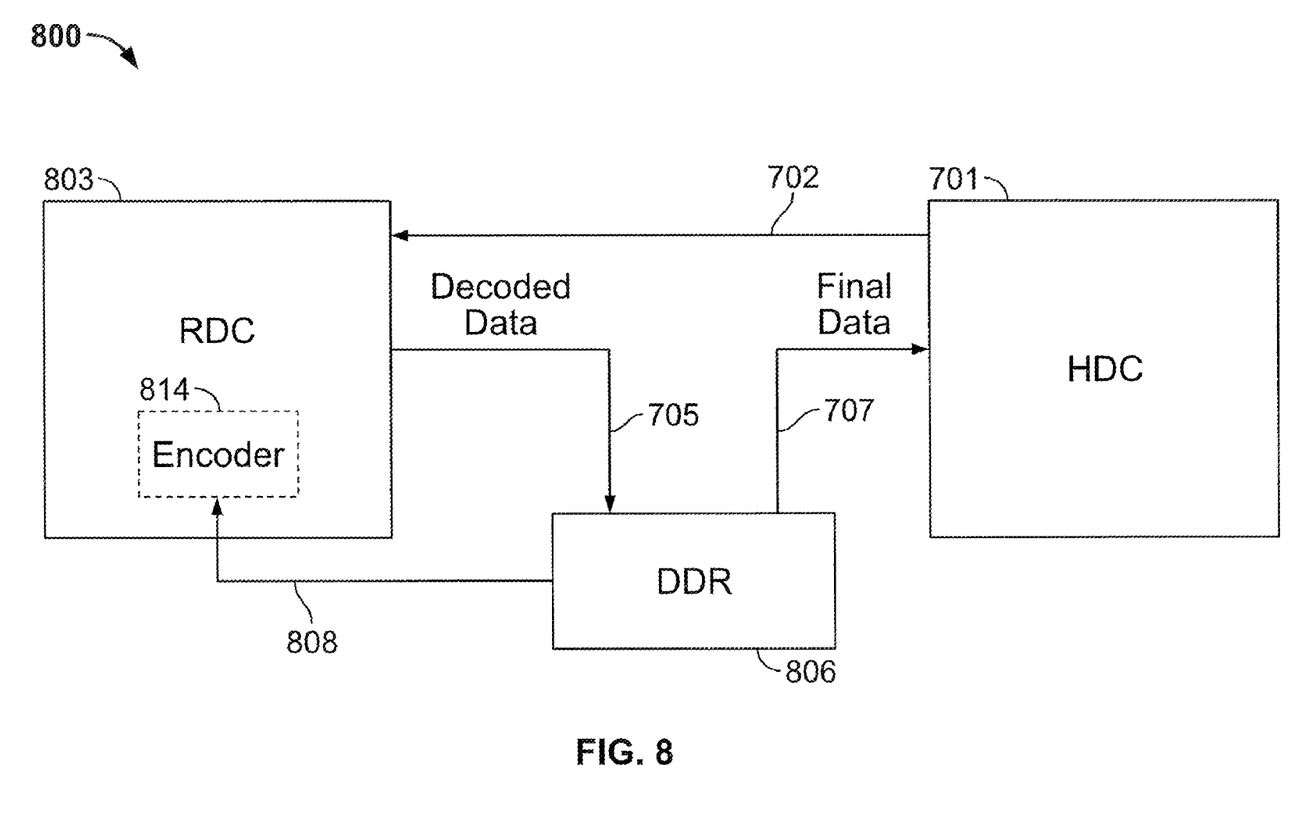
FIG. 8 is a schematic representation of apparatus according to a second embodiment of the invention.

In an alternate embodiment such as embodiment 800 shown in FIG. 8, there is no prior track storage in read-data channel 803. Instead read-data channel 803 outputs decoded data to DDR 806 as is known, but instead of retaining that data only temporarily, DDR 806 retains the decoded data for a particular track at least for the duration of the time needed to decode a predetermined number of additional tracks, and possibly "permanently"—i.e., until apparatus 800 is powered down or otherwise reset, or until the available capacity for storing previously-read track data is exceeded, in which case, preferably, the least-recently read track data are overwritten. In such an embodiment, when read-data channel 803 is decoding a particular track, it reads the decoded data 808 for any previous tracks that it needs from DDR 806—e.g., using direct memory access (DMA). The final data are read at 707 by device controller 701, as above. It will be appreciated that DDR 806 may be substantially identical to DDR 706, except in terms of capacity, which would be greater in DDR 806 than in DDR 706 because of the need to store previously-read track data.

As above, instead of storing the NRZ data from the previously-read track or tracks in DDR 806, if the previous track or tracks were successfully decoded, the actual decoded user bits may be stored in DDR 806, which would consume less space in DDR 806. In such an embodiment, optional encoder 814 would be provided to re-encode the user bits for use in removing ITI from the current track.

In the expression above, the ideal adjacent track signal $\hat{y}_2(t)$ is determined based on the NRZ data ai. However, $\hat{y}_2(t)$ corresponds to the adjacent-track FIR data less noise. Therefore, in a further embodiment 900 shown in FIG. 9, read-data channel 903 outputs decoded data for a given track to DDR 906 as above, but also outputs filter samples 905 (e.g., FIR filter samples) from that given track for storage in DDR 906.

Figure 9:
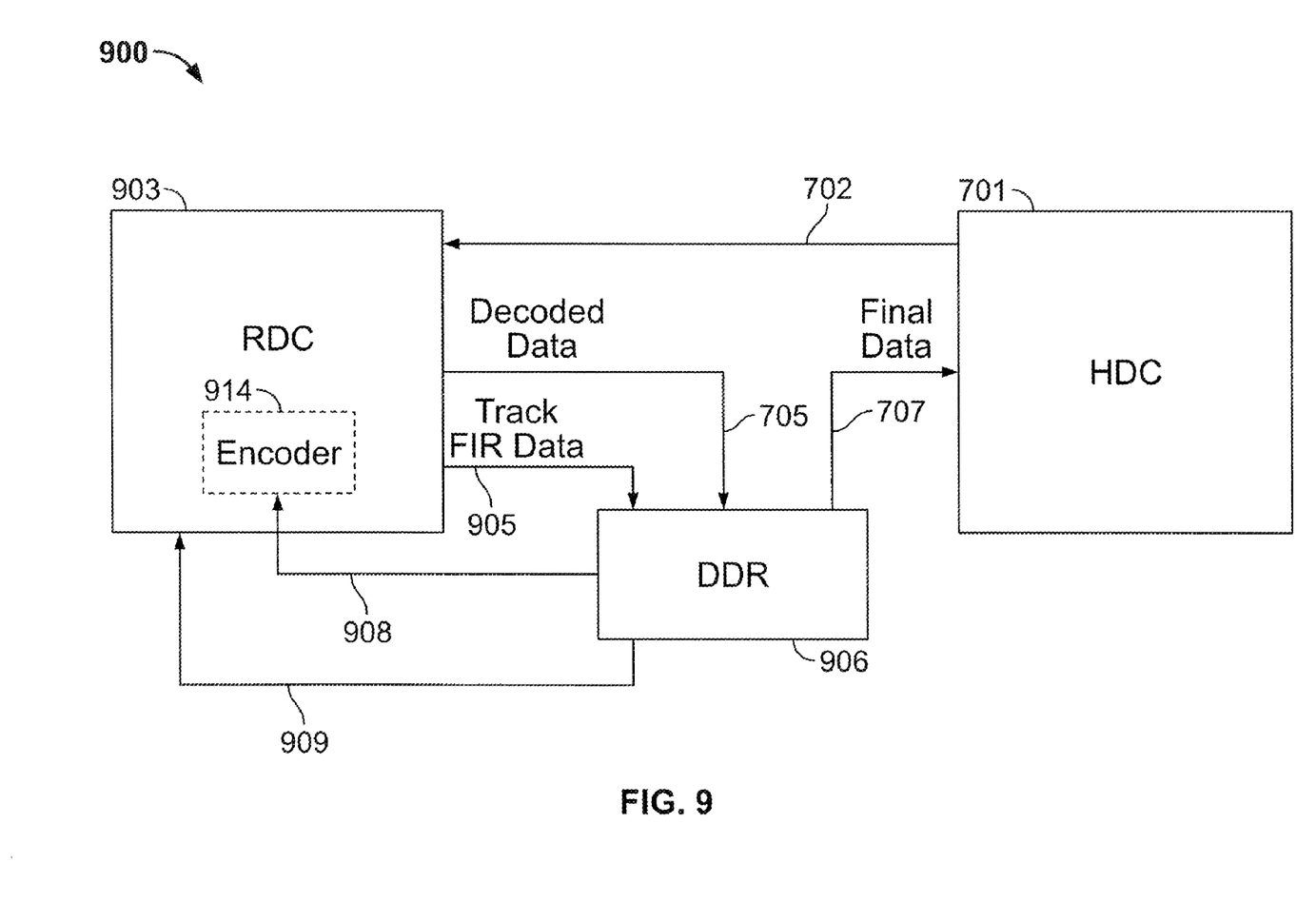
FIG. 9 is a schematic representation of apparatus according to a third embodiment of the invention.

In such an embodiment, when read-data channel 903 is decoding a particular track, it reads either the decoded channel data 908 or the channel filter data 909 for any previous tracks that it needs, or both, from DDR 906. The ITI to be removed from the current track can be determined from either one alone, or a combination derived from both, such as an average, may be used. The final data are read at 707 by device controller 701, as above. It will be appreciated that DDR 906 may be substantially identical to DDR 806, except in terms of capacity, which would be greater in DDR 906 than in DDR 806 because of the need to store filter samples for the previously-read track or tracks, as well as decoded data from that track or tracks. DDR 906 preferably retains the decoded data and the filter samples for a particular track at least for the duration of the time needed to decode a predetermined number of additional tracks, and possibly "permanently"—i.e., until apparatus 900 is powered down or otherwise reset, or until the available capacity for storing previously-read track data is exceeded, in which case, preferably, the least-recently read track data are overwritten.

As above, instead of storing the NRZ data from the previously-read track or tracks in DDR 906, if the previous track or tracks were successfully decoded, the actual decoded user bits may be stored in DDR 906, which would consume less space in DDR 906. In such an embodiment, optional encoder 914 would provided to re-encode the user bits for use in removing ITI from the current track.

Figure 10:
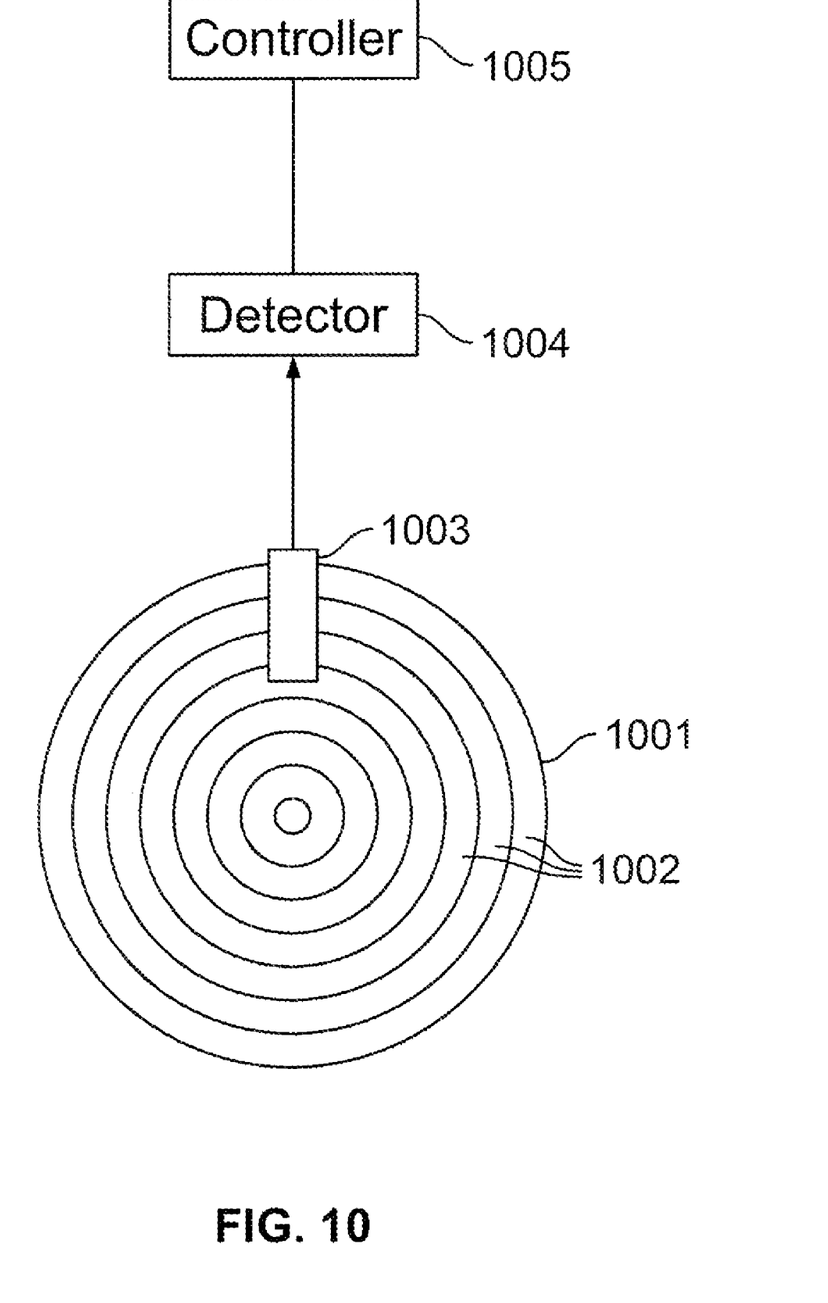
FIG. 10 is a schematic representation of a storage system according to embodiments of the invention.

A data storage system 1000 may include a storage medium such as a hard disk 1001 having a plurality of tracks 1002 which may be subject to potential ITI or OTI. System 1000 also may include a read head 1003, a detector 1004, and controller apparatus 1005, which may, for example, be any one of apparatus 700, 800 or 900.

Thus it is seen that a data storage system, and method of decoding stored data, in which contributions from one or more adjacent tracks may be accounted for in decoding one or more tracks of interest, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for reading a current track of data from a storage device, the method comprising:
    reading an adjacent track of data;
    decoding data from the adjacent track of data;
    reading data from the current track; and
    decoding the data read from the current track, based on the decoded data from the adjacent track of data, including deriving an interpolation filter from the decoded and stored data from the adjacent track of data by:
    computing a correlation matrix from the decoded and stored data from the adjacent track of data,
    computing a vector from the data from the current track, and
    multiplying the correlation matrix by the vector.

2. The method of claim 1 wherein decoding the data read from the current track, based on the decoded data from the adjacent track of data further comprises:
    determining adjacent track data amplitude;
    determining adjacent track data phase-shift; and
    computing an adjacent track signal portion using the adjacent track data amplitude and the adjacent track data phase-shift.

3. The method of claim 1 wherein the deriving an interpolation filter from the decoded data from the adjacent track of data further comprises inverting the correlation matrix before the multiplying.

4. The method of claim 1 wherein:
    the adjacent track of data comprises a plurality of adjacent tracks of data; and
    the reading data from the current track comprises positioning a read head to read data from the current track and only one adjacent track.

5. The method of claim 1 wherein:
    the current track of data comprises a plurality of current tracks of data; and
    the decoding the data from the current track comprises two-dimensional decoding.

6. The method of claim 1 wherein the decoding is based on inter-track interference.

7. The method of claim 1 wherein the decoding is based on off-track interference.

8. A storage controller comprising:
    a device controller; and
    a read data channel including a decoder for decoding output of a detector; wherein:
    the detector is for reading data requested from a storage medium by said device controller;
    the storage medium has a plurality of tracks of data thereon; and
    when said device controller requests data from a current track of data on said storage medium:
    said detector reads an adjacent track of data,
    said decoder decodes data from the adjacent track of data,
    said detector reads data from the current track, and
    said decoder decodes the data read from the current track, based on the decoded data from the adjacent track of data, including deriving an interpolation filter from the decoded data from the adjacent track of data by:
    computing a correlation matrix from the decoded and stored data from the adjacent track of data,
    computing a vector from the data from the current track, and
    multiplying the correlation matrix by the vector.

9. The storage controller of claim 8 further comprising memory for storing said data from the adjacent track of data.

10. The storage controller of claim 9 wherein said memory is in said read data channel.

11. The storage controller of claim 9 wherein said memory is separate from said read data channel.

12. The storage controller of claim 8 wherein:
    the read data channel decodes the data read from the current track by further:
    determining adjacent track data amplitude;
    determining adjacent track data phase-shift, and
    computing an adjacent track signal portion using the adjacent track data amplitude and the adjacent track data phase-shift.

13. The storage controller of claim 8 wherein the decoder of the read data channel inverts the correlation matrix before the multiplying.

14. The storage controller of claim 8 wherein the decoding is based on inter-track interference.

15. The storage controller of claim 8 wherein the decoding is based on off-track interference.

* * * * *